(12) United States Patent
Mommerency et al.

(10) Patent No.: US 12,414,504 B2
(45) Date of Patent: Sep. 16, 2025

(54) MOVEABLE CHAFF PAN FOR AGRICULTURAL VEHICLE

(71) Applicant: CNH Industrial America LLC, New Holland, PA (US)

(72) Inventors: Gilles Mommerency, Oostnieuwkerke (BE); Tim Passchyn, Sint-Michiels (BE); Nathan Isaac, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 648 days.

(21) Appl. No.: 17/860,441

(22) Filed: Jul. 8, 2022

(65) Prior Publication Data

US 2024/0008400 A1   Jan. 11, 2024

(51) Int. Cl.
*A01D 41/12*  (2006.01)
*A01F 12/44*  (2006.01)

(52) U.S. Cl.
CPC ........ *A01D 41/1243* (2013.01); *A01F 12/446* (2013.01)

(58) Field of Classification Search
CPC ................ A01D 41/00; A01D 41/1243; A01D 41/1276; A01F 12/30; A01F 12/40; A01F 12/444; A01F 12/446
See application file for complete search history.

(56) References Cited

U.S. PATENT DOCUMENTS

| | | | |
|---|---|---|---|
| 2,441,917 A | 5/1948 | Dion | |
| 6,554,701 B1 | 4/2003 | Wolters | |
| 6,582,298 B2 * | 6/2003 | Wolters | A01D 41/1243 460/103 |
| 8,152,609 B2 | 4/2012 | Benes et al. | |
| 8,834,243 B2 * | 9/2014 | Benes | A01D 41/1243 460/97 |
| 9,497,903 B2 | 11/2016 | Biggerstaff | |
| 2003/0100353 A1 | 5/2003 | Wolters | |
| 2011/0053667 A1 | 3/2011 | Benes et al. | |
| 2020/0154642 A1 | 5/2020 | Desmet et al. | |

FOREIGN PATENT DOCUMENTS

EP    3618603 B1    7/2021

OTHER PUBLICATIONS

Extended European Search Report prepared for EP Patent Application No. 23184308.7 dated Dec. 8, 2023 (5 pages).

* cited by examiner

*Primary Examiner* — Joseph M Rocca
*Assistant Examiner* — Robert E Pezzuto
(74) *Attorney, Agent, or Firm* — Buchanan Ingersoll & Rooney PC

(57) ABSTRACT

A chaff pan assembly for an agricultural vehicle includes a chaff pan that is moveable between raised and lowered positions. A stationary bracket is mounted to a fixed point on the agricultural vehicle. A linkage interconnects the chaff pan to the stationary bracket and guides movement of the chaff pan between the raised and lowered positions. A locking member is moveably connected to the stationary bracket and is moveable between a locked position, in which the locking member is engaged with one arm of the linkage to prevent movement of the one arm of the linkage, and an unlocked position, in which the locking member is disengaged from the one arm of the linkage to permit movement of the one arm of the linkage.

16 Claims, 4 Drawing Sheets

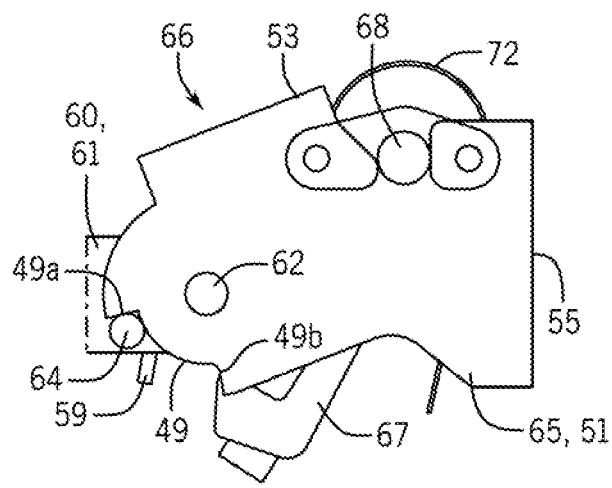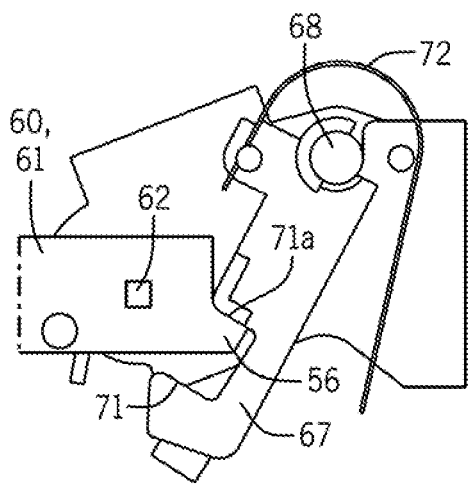
FIG. 4A  FIG. 4B
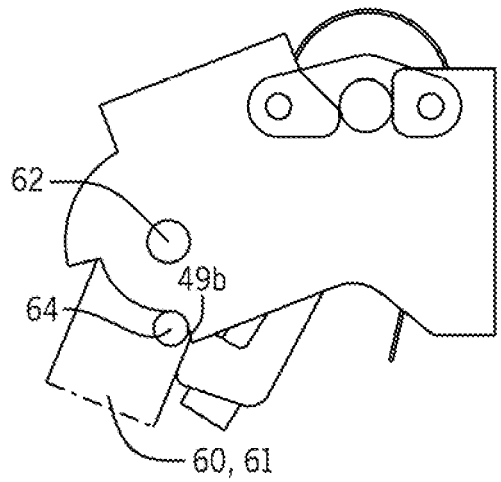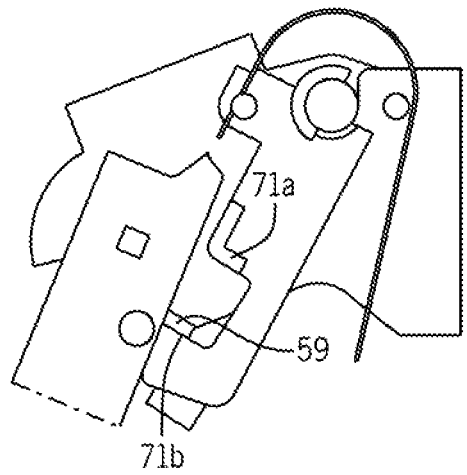
FIG. 5A  FIG. 5B

MOVEABLE CHAFF PAN FOR AGRICULTURAL VEHICLE

FIELD OF THE INVENTION

This invention relates generally to agricultural combines, and more particularly, to a foldable chaff pan that is positioned between a cleaning system and a chopper and/or spreader of an agricultural combine.

BACKGROUND OF THE INVENTION

As is described in U.S. Patent App. Pub. No. 20030100353 and 20110053667, which are each incorporated by reference in its entirety and for all purposes, it is known to mount a pivotable chaff pan to an oscillating chaffer rail, frame or other enclosure of a combine harvester.

Described herein is a cost-effective and convenient arrangement for locking a chaff pan, which is connected to an oscillating chaffer rail, in both a raised position and a lowered position of the chaff pan. In the raised position, the chaff pan is maintained in a position to pass chaff to a spreader/chopper. In the lowered position, the chaff pan is positioned to windrow the chaff, and thereby bypass the spreader/chopper.

This description of the background is provided to assist with an understanding of the following explanations of exemplary embodiments, and is not an admission that any or all of this background information is necessarily prior art.

SUMMARY

In a first exemplary aspect, a chaff pan assembly (27) for an agricultural vehicle (12) is provided. The chaff pan assembly includes a chaff pan (28) that is moveable between a raised position and a lowered position; a stationary bracket (65) that is configured to be mounted to a fixed point (22) on the agricultural vehicle (12); and a linkage (52, 58, 60) that interconnects the chaff pan (28) to the stationary bracket (65) and guides movement of the chaff pan (28) between the raised and lowered positions. The chaff pan (28) assembly further comprises a locking member (67) that is moveably connected to the stationary bracket (65) and is moveable between a locked position, in which the locking member (67) is engaged with one arm (60) of the linkage to prevent movement of the one arm (60) of the linkage, and an unlocked position, in which the locking member (67) is disengaged from the one arm (60) of the linkage to permit movement of the one arm (60) of the linkage. The moveable locking member (67) is moveable to the locking position in both the raised and the lowered positions of the chaff pan (28) to prevent movement of the one arm (60) of the linkage in both the raised and lowered positions of the chaff pan (28).

BRIEF DESCRIPTION OF THE DRAWINGS

Embodiments of inventions will now be described, strictly by way of example, with reference to the accompanying drawings, in which:

FIGS. 4A and 4B depict side elevation and cross-sectional views, respectively, of a portion of the lever arm and lock assembly, wherein the lever arm is shown in the raised position (corresponding to the raised position of the chaff pan shown in FIG. 1) and the lock assembly is shown in the locked position. FIG. 4B is taken along the lines 4B-4B in FIG. 3.

FIGS. 5A and 5B depict a side elevation and cross-sectional views, respectively, of the lever arm (end portion shown) and lock assembly, wherein the lever arm is shown in the lowered position (corresponding to the lowered position of the chaff pan shown in FIG. 2) and the lock assembly is shown in the locked position.

DETAILED DESCRIPTION OF THE DRAWINGS

Figure 1:
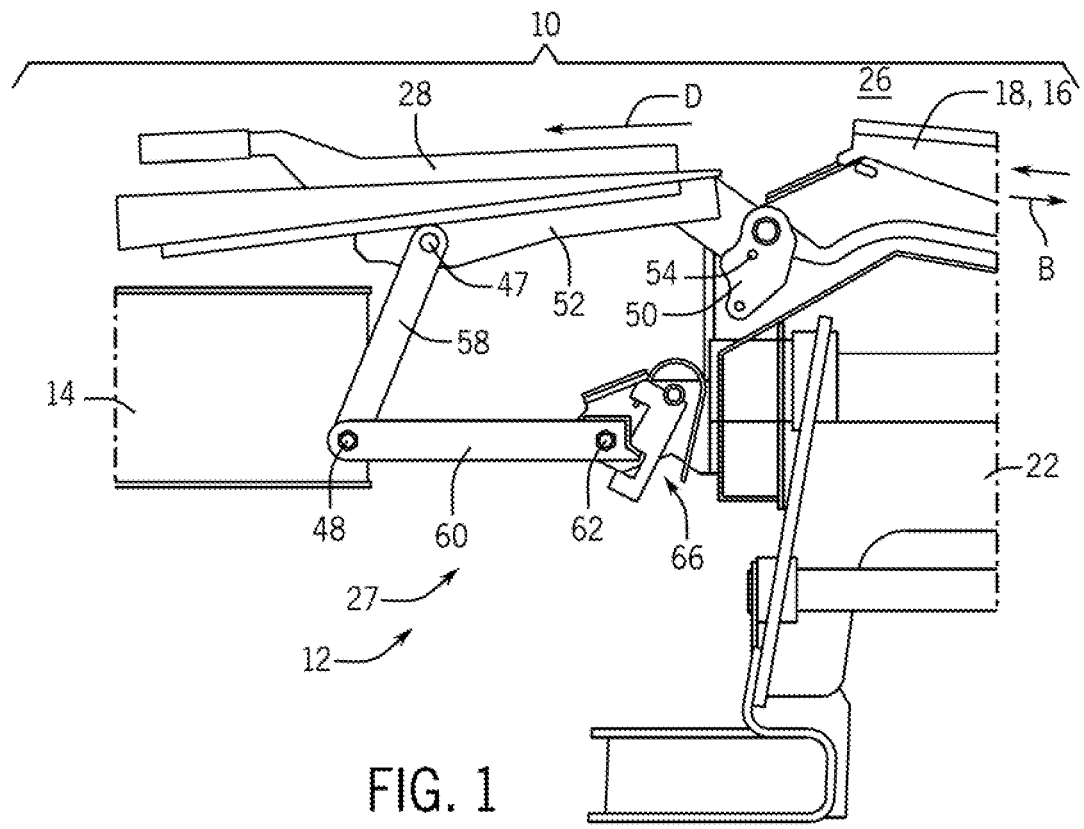
FIG. 1 is a simplified, side elevational representation of a rear end of an agricultural combine including a foldable oscillating chaff pan according to the present invention, wherein the chaff pan is shown in a raised position.

In the figures, like reference numerals refer to the same or similar elements.

The terms "forward," "rearward," "left," and "right", when used in connection with the agricultural harvester (e.g. combine) and/or components thereof are usually determined with reference to the direction of forward operative travel of the combine, but they should not be construed as limiting. The terms "longitudinal" and "transverse" are determined with reference to the fore-and-aft direction of the agricultural combine and are also not to be construed as limiting.

The drawings depict one or more exemplary and non-limiting implementations in accordance with the present concepts. The examples are shown in conjunction with an agricultural combine harvester, but have applicability in any similar agricultural vehicle, such as a windrower or other equipment.

FIG. 1 shows a rear end 10 of a self-propelled agricultural combine 12. Combine 12 includes a threshing section (not shown) for separating grain and chaff from straw, stalks, and other residue. After separation from the straw, stalks, and other residue by the threshing system, the grain is separated from chaff by cleaning apparatus 16. Cleaning apparatus 16 includes at least one generally horizontal chaffer or sieve (not shown) supported on front-to-rear extending chaffer rails 18 (one shown) located on opposite sides of the chaffer or sieve, the chaffer or sieve including apertures therethrough adjustable in size for allowing passage of grains of a selected maximum size therethrough, while preventing the larger chaff from passing therethrough, for separating the grain from the chaff in the well-known conventional manner. Cleaning apparatus 16 is oscillated in one or more generally horizontal directions, as denoted by arrows B, by oscillating apparatus (not shown) to facilitate the separation of the grain from the chaff, also in the well-known conventional manner.

A chaff pan assembly 27 generally includes a chaff pan 28 that is movably connected to a lock assembly 66 by a linkage. Lock assembly 66 is mounted to the frame 22 of combine and includes a locking member that enables locking/unlocking of the chaff pan 28 in either a raised or a lowered position, and the linkage guides movement of the chaff pan 28 between the raised and lowered positions.

At the outset it is noted that although the chaff pan 28 may be described herein as locked in either a raised or lowered position, it should be understood that the chaff pan is not prevented from oscillating movement in those locked positions.

Figure 2:
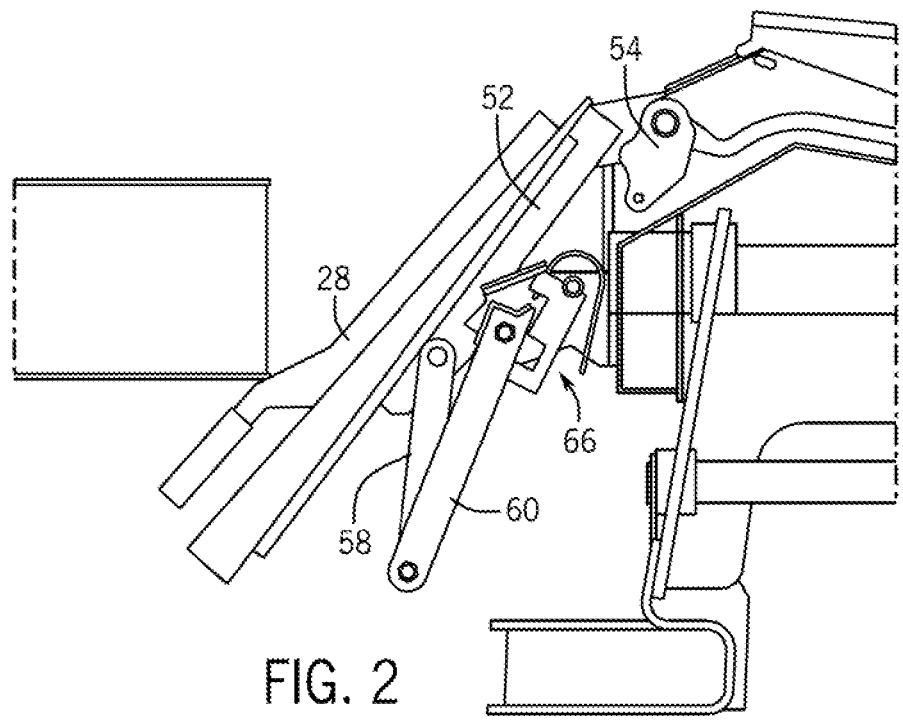
FIG. 2 is another view of the rear end of the agricultural combine, wherein the chaff pan is shown in a lowered position.

Referring now to the individual components of chaff pan assembly 27, chaff pan 28 that is attached or mounted to chaff rails 18 of cleaning apparatus 16 so as to oscillate therewith and importantly so as to be pivotable relative thereto between a raised position (FIG. 1) and a lowered position (FIG. 2). In the raised position, chaff pan 28 directs directing the flow of chaff as represented by arrows D toward rotary device 14 (i.e., a chopper or spreader) for further processing. In the lowered position, chaff pan 28 directs the flow of chaff downward onto the ground in a windrow.

The linkage includes an arm 52 is fixedly connected to the side of pan 28. A pivot joint 54 pivotally connects arm 52 to a bracket 50 that is fixedly connected to the chaffer rail 18. Arm 52 has a first elongated portion that is connected to pan 28, and a second shorter portion that is connected to bracket 50 by pivot joint 54. One end of a shaker arm 58 is pivotally connected to arm 52 by pivot joint 47. An opposite end of shaker arm 58 is pivotably connected to a free end of a lever arm 60 by pivot joint 48. Lever arm 60 has an opposite end that is pivotally connected to frame 22 by a lever arm pivot 62 located on a lock assembly 66 fixedly mounted to frame 22. Further details of arm 60 will be described with reference to the lock assembly 66.

Arms 52, 58 and 60 along with pivot joints 47, 48 and 54 may be considered as forming a pivotable three-bar linkage. The pivot joints at 47, 48 and 54 also enable oscillating movement of pan 28 when pan 28 is maintained in either a raised or lowered position. It is noted that mounting the linkage to the frame 22 of the combine distributes the weight of the chaff pan 28 onto the frame 22 of the combine in a desirable way as opposed to the cleaning section of the combine carrying the weight of the chaff pan 28.

Although one side of chaff pan assembly 27 is shown in FIGS. 1 and 2, it should be understood that the same components are positioned on the other side of chaff pan assembly.

Figure 3:
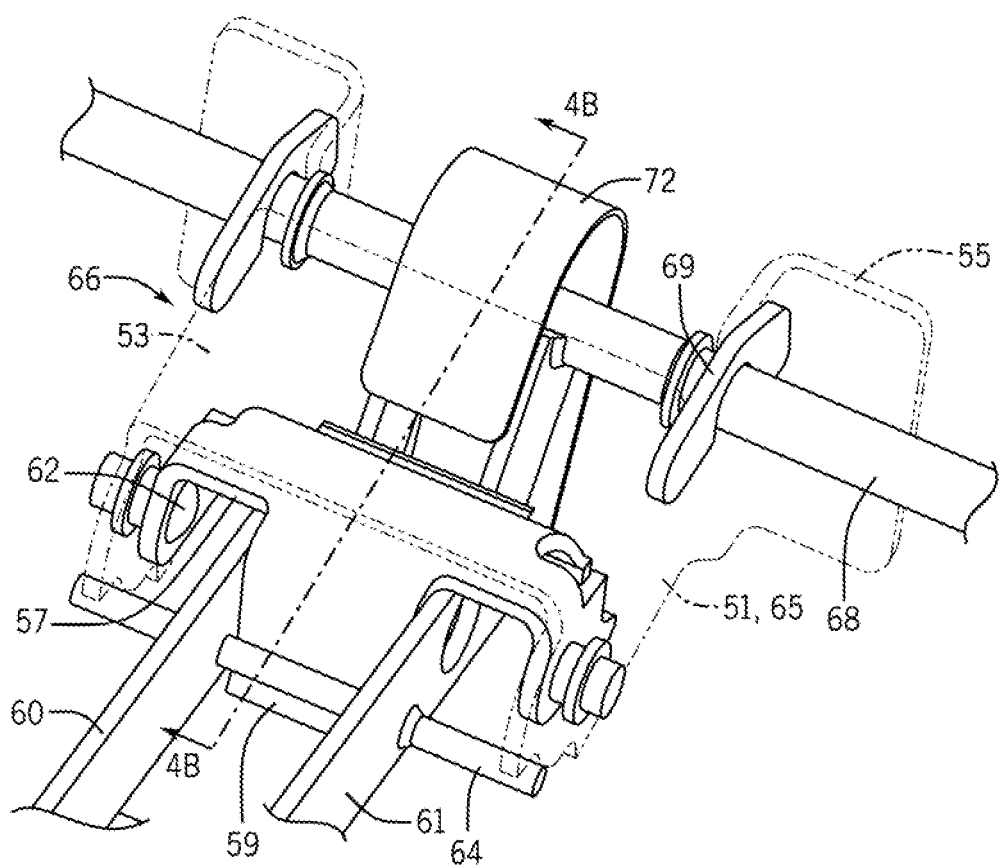
FIG. 3 depicts an isometric view of a lock assembly for connecting the chaff pan to the frame of the combine.

Lock assembly 66 and the end of lever arm 60 that is connected to lock assembly 66 are best shown in FIGS. 3-4B. Lock assembly 66 generally comprises a stationary bracket 65 having a mounting surface 55 that is fixedly coupled to frame 22 by fasteners, and a locking member 67 that is pivotably (or otherwise moveably) coupled to bracket 65 by a rod 68 that passes through registered openings in both locking member 67 and bracket 65.

The end of lever arm 60, which is connected to lock assembly 66, generally includes (i) two elongated plates 61, (ii) a winged mounting portion 57 extending from the plates 61 that is positioned between opposing sides of bracket 65 and pivotably mounted to those sides by the pivot joints 62 (one shown), and (iii) a transverse rod 64 passing through the plates 61. Rod 64 forms a bearing surface, as will be described later. A tab 59 extends from the winged mounting portion 57 to an elevation beneath the plates 61. At least a portion of tab 59 is positioned between an axis passing through rod 64 and an axis passing through pivot joint 62. Tab 59 also forms a bearing surface, as will be described later. Also, yet another bearing surface 56 projects from the free end of lever arm 60 for interacting with locking member 67, as will be described hereinafter. Thus, arm 60 has three different bearing surfaces 64, 59 and 56 for preventing rotating of the arm 60 in at least one rotational direction, the purpose of each of which will be described later.

Stationary bracket 65 is a one-piece unitary sheet metal or cast component having two planar mounting surfaces/portions 55 (for mounting to frame 22, as described above), legs 51 longitudinally depending from each mounting surface 55, and a shoulder 53 extending transversely between and interconnecting the legs 51. A transversely extending rod 68 is mounted to openings disposed in opposing legs 51 of bracket 65 by bearings 69. On each leg 51, a cutout, recess or surface 49 is formed having two end-stop surfaces 49a and 49b, the purpose of which will be described later.

Locking member 67 includes an opening, recess or channel in which rod 68 is disposed. Locking member 67 is configured to pivot about rod 68. Locking member 67 has an open-ended cutout 71 formed in a central region thereof having two opposing bearing surfaces 71a and 71b. The lower end of locking member 67 forms a user-accessible handle for moving locking member 67 between its locked and unlocked positions.

A spring-loaded and resilient element 72 has one end that is fixed to locking member 67 and an opposite end that is mounted (or fixed) to bracket 65 by one or more fasteners. Resilient element 72 biases locking member 67 in the clockwise direction (as viewed in FIG. 4B) and toward the locking position shown in FIG. 4B (as well as FIG. 5B). Resilient element 72 may be in the form of a unitary sheet spring steel, for example. Resilient element 72 could also be a tension or compression spring, if so desired.

Turning now to FIGS. 4A and 4B, in the raised position of chaff pan 28, lever arm 60 is maintained in the raised and locked position (as shown in those figures). More particularly, in the raised and locked position of arm 60, rod 64 is positioned against end stop surface 49a to prevent rotation of arm 60 about pivot joint 62 in the clockwise direction (as viewed in FIG. 4A). And, bearing surface 56 of lever arm 60 bears against bearing surface 71a of locking member 67 to prevent rotation of arm 60 in the counter clockwise direction (as viewed in FIG. 4B) about pivot joint 62. Thus, lever arm 60 is prevented from pivoting about pivot joint 62.

As a result of pivot joints 47, 48 and 54, chaff pan 28 is capable of oscillating along with chaff rail 18 even when arm 60 is maintained in either a raised or a lowered position and regardless of whether arm 60 is maintained in the locked position by locking member 67.

Turning now to FIGS. 5A and 5B, in the lowered position of chaff pan 28, lever arm 60 is maintained in the lowered and locked position (as shown in those figures). More particularly, in the lowered and locked position of arm 60, rod 64 is positioned against end stop surface 49b to prevent rotation of arm 60 about pivot joint 62 in the counterclockwise direction (as viewed in FIG. 5A). And, tab 59 of lever arm 60 bears against bearing surface 71b of locking member 67 to prevent rotation of arm 60 about pivot joint 62 in the clockwise direction (as viewed in FIG. 5B). Thus, lever arm 60 is prevented from pivoting about pivot joint 62 in the lowered and locked position. An exemplary sequence of movements between the raised/locked and the lowered/locked positions will be described hereinafter.

Figure 6A:
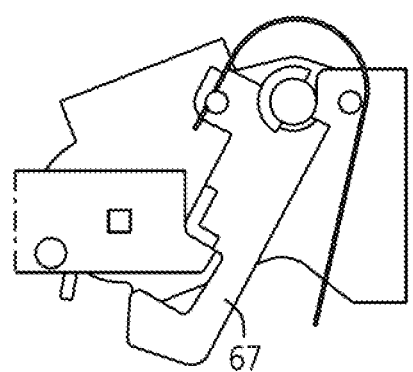
FIGS. 6A-6F depict a movement sequence of the lever arm (end portion shown) and the lock assembly from the raised and locked position (FIG. 6A) to the lowered and locked position (FIG. 6D) and back toward the raised position. The lever and the lock assembly are shown in cross-section in FIGS. 6A-6F, like FIG. 4B.
Figure 6B:
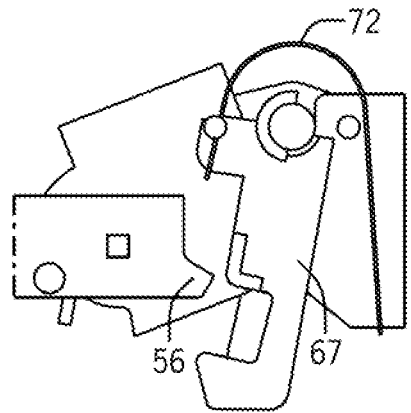

Turning now to FIGS. 6A-6F, starting from the raised and locked position of arm 60 of FIG. 6A, which corresponds to the raised position of chaff pan 28 shown in FIG. 1, as noted above, arm 60 is locked in the raised position as was described above with reference to FIGS. 4A and 4B. Turning now to FIG. 6B, to release arm 60 and chaff pan 28 from the raised and locked position, locking member 67 is moved in the direction of the arrow in FIG. 6B against the bias of resilient element 72, thereby releasing (i.e., disengaging) bearing surface 56 from locking member 67 as shown.

Movement of locking member 67 is preferably performed manually, but could be performed in an automated fashion by solenoids controlled in a cab of the combine.

Figure 6C:
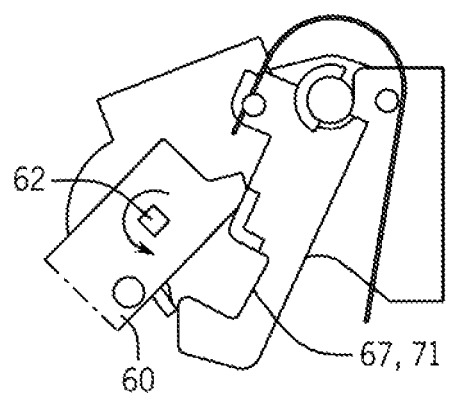
Figure 6D:
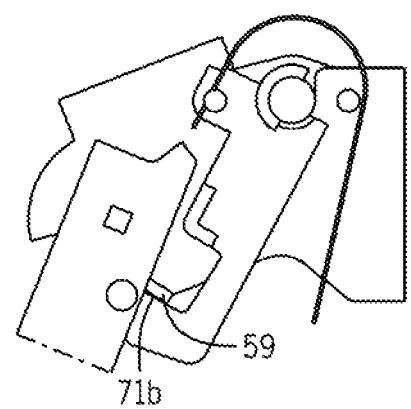

Turning now to FIG. 6C, to move arm 60 (as well as chaff pan 28) to the lowered position, arm 60 is rotated downwards and in the counterclockwise direction about pivot joint 62, as depicted by the arrow in that figure. Alternatively, chaff pan 28 may be rotated downwardly, which would cause arm 60 to rotate downwardly. The spring-loaded locking member 67 may be released as soon as bearing surface 56 clears the cutout 71 of locking member 67. Upon releasing locking member 67, bearing surface 56 can ride along the flat outer surface of locking member 67, and tab 59 can also ride along the outer surface of locking member 67 as the arm 60 continues to be rotated in the counter clockwise direction. Turning now to FIG. 6D, arm 60 is rotated further in the counterclockwise direction until the cutout 71 springs over tab 59 and the tab 71 becomes positioned within cutout 71. The resilient element 72 rotates locking member 67 so that bearing surface 71b engages against the bottom side of tab 59. At this time, arm 60 is maintained in the lowered and locked position, corresponding to the lowered position of chaff pan 28. The lowered and locked position of arm 60 was described previously in relation to FIGS. 5A and 5B. It should be understood that chaff pan 28 pivots to its lowered position under its own weight as arm 60 is moved to its lowered position, as guided by the above-described linkage.

Figure 6E:
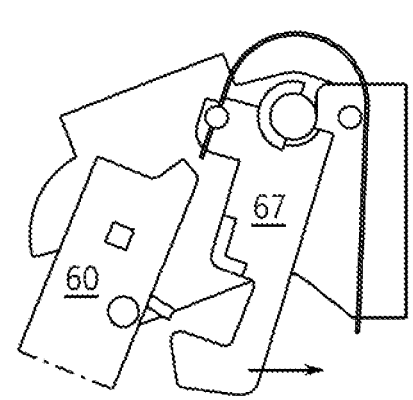
Figure 6F:
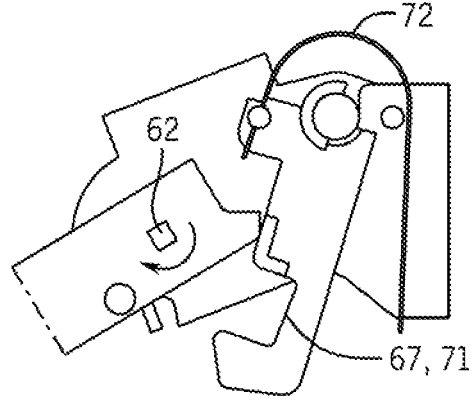

Turning now to FIG. 6E, to release arm 60 and chaff pan 28 from the lowered and locked position, locking member 67 is moved in the direction of the arrow in FIG. 6E against the bias of resilient element 72, thereby releasing tab 59 from bearing surface 71b. Turning now to FIG. 6F, to move arm 60 (as well as chaff pan 28) to the raised position, arm 60 is rotated upwards and in the clockwise direction about pivot joint 62, as depicted by the arrow of that figure. Spring-loaded locking member 67 may be released as soon as tab 59 clears the cutout 71 of locking member 67. Upon releasing locking member 67, bearing surface 56 can ride along the flat outer surface of locking member 67. Arm 60 is rotated further in the clockwise direction until the cutout 71 springs over the bearing surface 56 of arm 60 due to the spring force of resilient element 72. At that time, arm 60 is maintained in the raised and locked position shown in FIG. 6A. It should be understood that chaff pan 28 pivots to its raised position as arm 60 is moved to its raised position, as guided by the above-described linkage.

It should be understood that the movement sequence described above is not limited to any particular step of sequence of steps.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

What is claimed is:

1. A chaff pan assembly for an agricultural vehicle, said chaff pan assembly comprising:
    a chaff pan that is moveable between a raised position and a lowered position;
    a stationary bracket that is configured to be mounted to a fixed point on the agricultural vehicle;
    a linkage that interconnects the chaff pan to the stationary bracket and guides movement of the chaff pan between the raised and lowered positions; and
    a locking member that is moveably connected to the stationary bracket and is moveable between a locked position, in which the locking member is engaged with one arm of the linkage to prevent movement of the one arm of the linkage, and an unlocked position, in which the locking member is disengaged from the one arm of the linkage to permit movement of the one arm of the linkage,
    wherein the moveable locking member is moveable to the locking position in both the raised and the lowered positions of the chaff pan to prevent movement of the one arm of the linkage in both the raised and lowered positions of the chaff pan.

2. The chaff pan assembly of claim 1, wherein the chaff pan is configured to be connected to an oscillating chaff rail, and the linkage includes pivot joints that enable oscillating motion of the chaff pan in both the raised and lowered positions of the chaff pan.

3. The chaff pan assembly of claim 1, wherein, in the raised position of the chaff pan, the one arm of the linkage has a first rotational position, and in the lowered position of the chaff pan, the one arm of the linkage has a second rotational position that differs from the first rotational position.

4. The chaff pan assembly of claim 1, wherein the linkage is a three-bar linkage and the one arm of the linkage forms one of the bars of the three-bar linkage.

5. The chaff pan assembly of claim 1, further comprising a resilient member connected to the locking member for urging the locking member to the locked position.

6. The chaff pan assembly of claim 1, wherein the locking member is moveable to the unlocking position in both the raised and the lowered positions of the chaff pan to permit movement of the one arm of the linkage in both the raised and lowered positions of the chaff pan.

7. The chaff pan assembly of claim 1, wherein the one arm comprises three different bearing surfaces, wherein in a raised and locked position of the chaff pan, a first bearing surface of the three different bearing surfaces is engaged with a first mating bearing surface of the stationary bracket to prevent movement of the one arm in a first direction, and a second bearing surface of the three different bearing surfaces is engaged with a first mating bearing surface of the locking member to prevent movement of the one arm in a second direction that is opposite the first direction.

8. The chaff pan assembly of claim 7, wherein in a lowered and locked position of the chaff pan, the first bearing surface of the three different bearing surfaces is engaged with a second mating bearing surface of the stationary bracket to prevent movement of the one arm in the second direction, and a third bearing surface of the three different bearing surfaces is engaged with a second mating bearing surface of the locking member to prevent movement of the one arm in the first direction.

9. The chaff pan assembly of claim 8, wherein the first and second mating bearing surfaces of the stationary bracket are defined by a channel formed in the stationary bracket.

10. The chaff pan assembly of claim 8, wherein the first and second mating bearing surfaces of the locking member are defined by a channel formed in the locking member.

11. The chaff pan assembly of claim 7, wherein the first bearing surface of the three different bearing surfaces comprises a rod that is fixed to the one arm.

12. The chaff pan assembly of claim 1, wherein the one arm is pivotably connected to the stationary bracket by a pivot joint.

13. The chaff pan assembly of claim 1, further comprising a user handle on the locking member.

14. An agricultural vehicle comprising the chaff pan assembly of claim 1.

15. The agricultural vehicle of claim 14, wherein the agricultural vehicle is a combine harvester.

16. The chaff pan assembly of claim 1, wherein the locking member moves independently of the stationary bracket and the linkage.

\* \* \* \* \*